US008536664B1

(12) United States Patent
Tsai et al.

(10) Patent No.: US 8,536,664 B1
(45) Date of Patent: Sep. 17, 2013

(54) MEMS DEVICE WITH INTEGRATED MEMORY CELLS

(75) Inventors: Richard Tsai, Arcadia, CA (US); Xiaolei Liu, Los Angeles, CA (US)

(73) Assignee: DigitalOptics Corporation MEMS, Arcadia, CA (US)

( * ) Notice: Subject to any disclaimer, the term of this patent is extended or adjusted under 35 U.S.C. 154(b) by 526 days.

(21) Appl. No.: 11/735,803

(22) Filed: Apr. 16, 2007

(51) Int. Cl.
*G03B 17/00* (2006.01)

(52) U.S. Cl.
USPC .......... 257/415; 257/529; 257/E23.149; 257/E31.032; 396/310

(58) Field of Classification Search
USPC .......... 365/164, 96, 174; 396/133, 439, 396/452, 310; 257/529, 415, E23.149, E31.002, 257/E31.032
See application file for complete search history.

(56) References Cited

U.S. PATENT DOCUMENTS

| 5,404,552 | A | | 4/1995 | Ikenaga |
| 5,607,456 | A | | 3/1997 | Tellini |
| 5,860,130 | A | | 1/1999 | Yamanaka et al. |
| 5,999,753 | A | * | 12/1999 | Hirai et al. ............... 396/227 |
| 6,292,826 | B1 | | 9/2001 | Zaifman et al. |
| 6,473,361 | B1 | | 10/2002 | Chen et al. |
| 6,785,892 | B1 | | 8/2004 | Miller et al. |
| 6,885,467 | B2 | | 4/2005 | Du-Nour et al. |
| 7,023,031 | B2 | * | 4/2006 | Tsai ............................ 257/209 |
| 7,050,320 | B1 | | 5/2006 | Lai et al. |
| 7,054,802 | B2 | | 5/2006 | Ohkami |
| 7,590,341 | B2 | * | 9/2009 | Iijima et al. ............... 396/133 |
| 2002/0005563 | A1 | * | 1/2002 | Shu ............................ 257/529 |
| 2006/0056076 | A1 | * | 3/2006 | Araki et al. ............... 359/811 |
| 2006/0133786 | A1 | * | 6/2006 | Teramoto ..................... 396/55 |
| 2006/0204242 | A1 | * | 9/2006 | Gutierrez et al. ........... 396/439 |
| 2008/0157240 | A1 | * | 7/2008 | Zhu ............................ 257/422 |

FOREIGN PATENT DOCUMENTS

WO WO 2005101083 A1 * 10/2005

OTHER PUBLICATIONS

What is MEMS Technology?, http://www.memsnet.org/mems/what-is.html, Feb. 2, 2007 (1 page).
Microelectromechanical Systems, Wikipedia, the free encyclopedia, http://en.wikipedia.org/wiki/MEMS, Jan. 24, 2007 (6 pages).

* cited by examiner

*Primary Examiner* — Allison P Bernstein
(74) *Attorney, Agent, or Firm* — Haynes and Boone, LLP

(57) ABSTRACT

A MEMS device can include an actuator, a base formed from a substrate, and a plurality of memory cells integrated with the base. At least a portion of the base can be configured to move in response to the actuator. A miniature camera can include a base comprising a frame, a stage, and a plurality of flexures configured to connect the stage with the frame. The flexures can be adapted to bend to permit the stage to move relative to the frame. The camera can include a plurality of memory cells integrated with the base, a lens mount secured to the stage, a lens barrel secured to the lens mount, an image sensor, and an actuator adapted to move the stage relative to the frame and the image sensor.

15 Claims, 5 Drawing Sheets

MEMS DEVICE WITH INTEGRATED MEMORY CELLS

BACKGROUND

1. Technical Field

The invention generally relates to micro-electro-mechanical systems for use with electronic devices.

2. Related Art

As is well known, micro-electro-mechanical systems (MEMS) devices can be used to provide mechanical features on extremely small scales. For example, in one application, MEMS devices may be used to implement various mechanical features of personal electronic devices.

In order to support such capabilities, the structural portions of MEMS devices may be interfaced with separate external electronic circuits. Unfortunately, such configurations can cause difficulties in the miniaturization of MEMS devices. In particular, the space used to accommodate separate circuits interfaced with MEMS structural components can limit the ability of manufacturers to further reduce the size of personal electronic devices using MEMS devices.

In addition, the separate manufacture and subsequent assembly of such structural components and electronic circuits can increase the time and costs associated with MEMS device production. Consequently, such problems can impact the ability of businesses to bring MEMS-based products to market in a competitive fashion.

SUMMARY

In accordance with one embodiment of the invention, a MEMS device includes an actuator; a base formed from a substrate, wherein at least a portion of the base is configured to move in response to the actuator; and a plurality of memory cells integrated with the base.

In accordance with another embodiment of the invention, a method of manufacturing a MEMS device includes manufacturing a base from a substrate, wherein at least a portion of the base is configured to move in response to an actuator; and manufacturing a plurality of memory cells integrated with the base.

In accordance with another embodiment of the invention, a miniature camera includes a base comprising a frame, a stage, and a plurality of flexures configured to connect the stage with the frame, wherein the flexures are adapted to bend to permit the stage to move relative to the frame; a plurality of memory cells integrated with the base; a lens mount secured to the stage; a lens barrel secured to the lens mount; an image sensor adapted to capture images from light received through the lens barrel; and an actuator adapted to move the stage relative to the frame and the image sensor.

These and other features and advantages of the invention will be more readily apparent from the detailed description of the embodiments set forth below taken in conjunction with the accompanying drawings.

BRIEF DESCRIPTION OF THE FIGURES

Like element numbers in different figures represent the same or similar elements.

DETAILED DESCRIPTION

Figure 1:
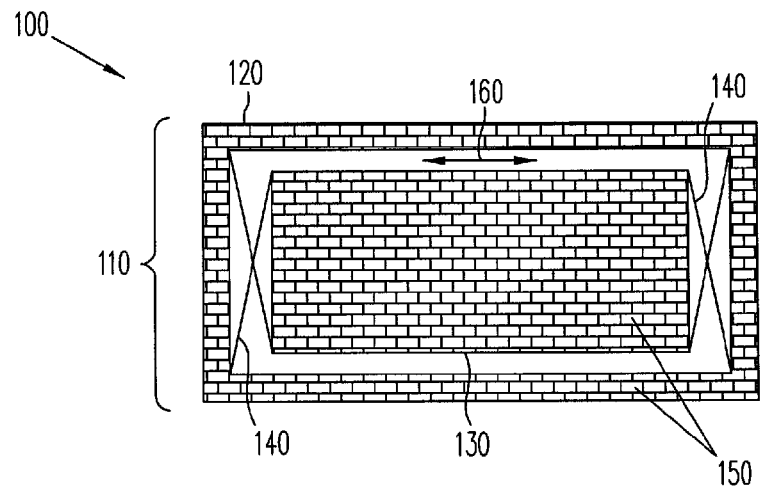
FIG. 1 illustrates a MEMS device with a plurality of integrated memory cells in accordance with an embodiment of the invention.

In accordance with embodiments further described herein, a MEMS device with integrated memory cells, and related manufacturing techniques are provided. Referring now to the drawings wherein the showings are for purposes of illustrating embodiments of the invention only, and not for purposes of limiting the same, FIG. 1 illustrates a MEMS device 100 with a plurality of integrated memory cells 150 in accordance with an embodiment of the invention. In the embodiment of FIG. 1, MEMS device 100 may be used in connection with, for example, a miniature camera. In this regard, MEMS device includes a base 110 integrated with memory cells 150.

As shown in FIG. 1, base 110 includes a frame 120 and a stage 130 connected together by a plurality of flexures 140. Flexures 140 may be implemented as flexible members which permit stage 130 to be translated back and forth relative to frame 120 in the directions of arrows 160. When MEMS device 100 is implemented as part of a miniature camera, a lens barrel may be secured to stage 130 by, for example, an appropriate lens mount. In such an embodiment, stage 130 may be translated in the directions of arrows 160 by an appropriate actuator.

In one embodiment, frame 120, stage 130, and flexures 140 of base 110 may be implemented as one integral body formed from a substrate. For example, base 110 may be formed from a monolithic silicon substrate (e.g., from a silicon wafer). In another embodiment, base 110 may be implemented as an assembly of frame 120, stage 130, and flexures 140.

Memory cells 150 may be implemented on any desired portion of base 110. For example, memory cells 150 may be implemented on frame 120, stage 130, and/or flexures 140. Memory cells 150 may be configured to store various logic states corresponding to any desired data. For example, memory cells 150 may be used to store lot numbers or other characteristic information associated with MEMS device 100, or other information. In various embodiments, memory cells 150 may be programmed and/or read during operation of MEMS device 110.

Memory cells 150 may be implemented as any desired type of memory cells which may be used in connection with MEMS device 100 for storing desired data. For example, memory cells 150 may be implemented, where appropriate, as dynamic or static random access memory, read only memory, flash memory, or other types of memory. In one embodiment, memory cells 150 may be implemented as an array of metal lines or contacts with an array of fuses that are selectively programmed to store a plurality of logic states.

Figure 2:
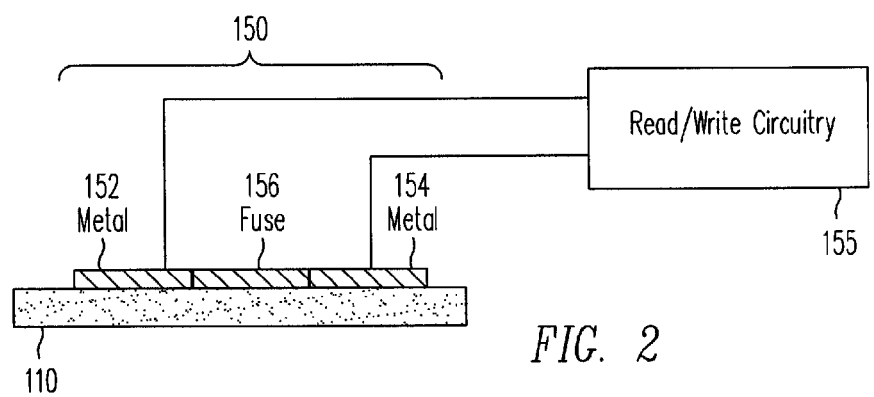
FIG. 2 illustrates a cross-section view of a portion of the MEMS device of FIG. 1 in accordance with an embodiment of the invention.

FIG. 2 illustrates a cross-section view of a portion of MEMS device 100 of FIG. 1 in accordance with an embodiment of the invention. In particular, FIG. 2 shows one of memory cells 150 implemented on base 110. In this embodiment, memory cell 150 includes metal portions 152 and 154 connected by a fuse 156. It will be appreciated that metal portions 152 and 154 may be implemented as contacts or pins connected with appropriate read/write circuitry 155 for decoding address information and determining a logic state stored by memory cell 150. For example, such circuitry may be configured to provide a voltage or current between metal portions 152 and 154 to determine whether fuse 156 has been blown. In addition, fault-tolerant methods may be applied to improve the yield. In one embodiment, a memory cell 150 with an intact fuse may be associated with a first logic state (for example, a data value of 0), and a memory cell 150 with a blown fuse may be associated with a second logic state (for example, a data value of 1).

In another embodiment, logic states stored by memory cells 150 may be discerned by human or machine visual inspection techniques. For example, in such an embodiment, logic states may be determined by visual inspection of blown and intact fuses of memory cells 150.

Figure 3:
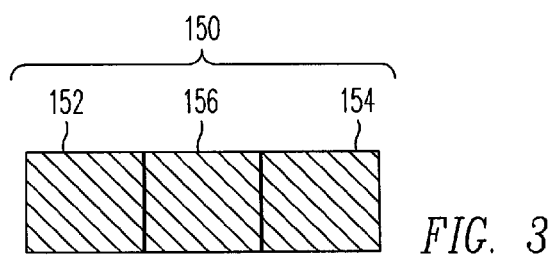
FIG. 3 illustrates a top view of one of the memory cells of FIG. 1 having an intact fuse in accordance with an embodiment of the invention.
Figure 4:
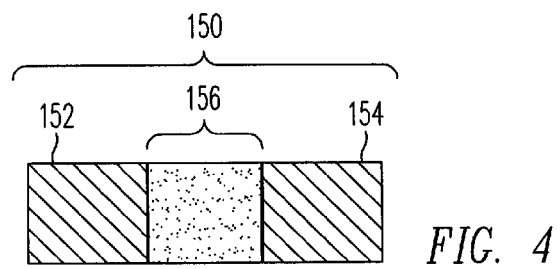
FIG. 4 illustrates a top view of one of the memory cells of FIG. 1 having a blown fuse in accordance with an embodiment of the invention.

FIG. 3 illustrates a top view of one of memory cells 150 of FIG. 1 where its associated fuse 156 has not been blown and is therefore configured to provide a conductive path between metal portions 152 and 154. In contrast, FIG. 4 illustrates a top view of one of memory cells 150 of FIG. 1 where its associated fuse 156 has been blown. As a result, the conductive path between metal portions 152 and 154 will be interrupted. In various embodiments, fuse 156 may be blown by, for example, applying an appropriate current between metal portions 152 and 154 by read/write circuitry 155, applying a laser to fuse 156, or other appropriate techniques.

In accordance with various embodiments of the invention, base 110 may be implemented using silicon or other materials which may be fashioned in accordance with semiconductor manufacturing techniques. Advantageously, such implementations can permit base 110 and memory cells 150 to be formed in a combined manufacturing process.

Figure 5:
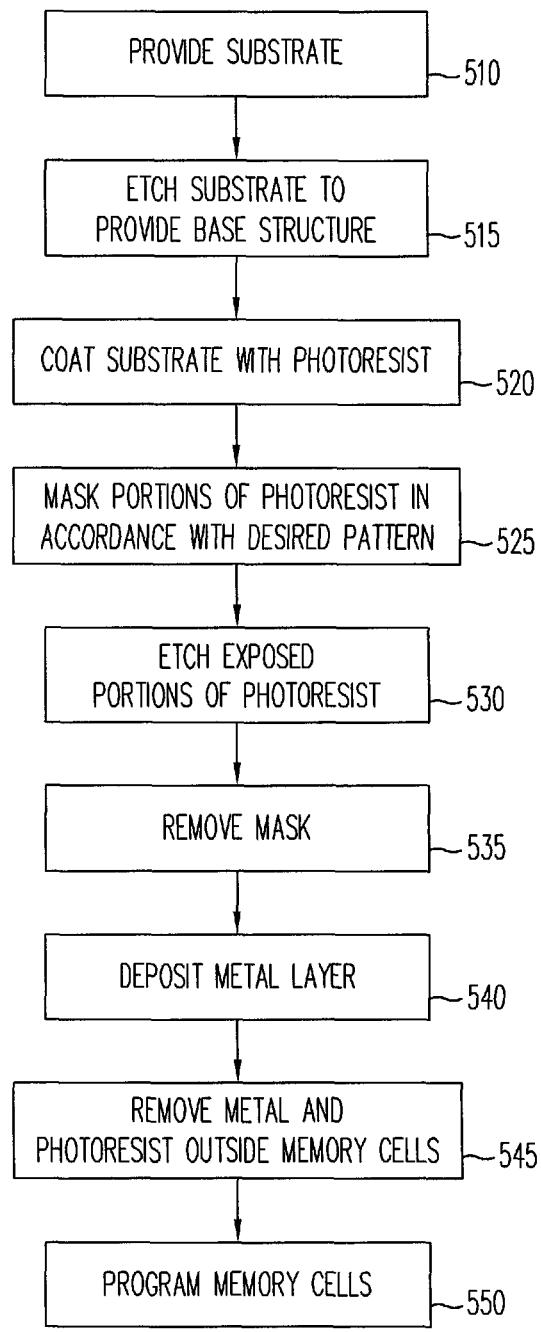
FIG. 5 illustrates a process of manufacturing a MEMS device with integrated memory cells in accordance with an embodiment of the invention.
Figure 6:
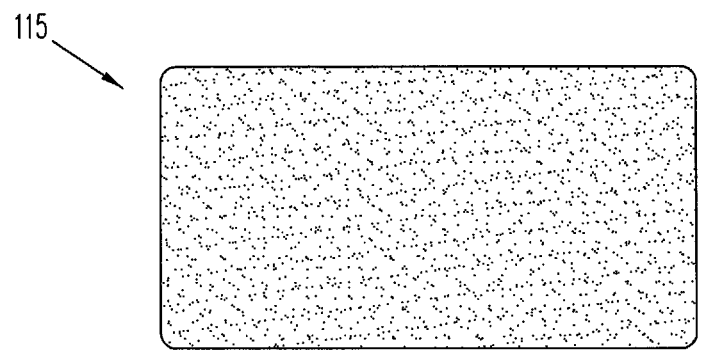
FIGS. 6 through 12A-B illustrate various cross-section side views and top views of a MEMS device undergoing a manufacturing process in accordance with an embodiment of the invention.
Figure 7:
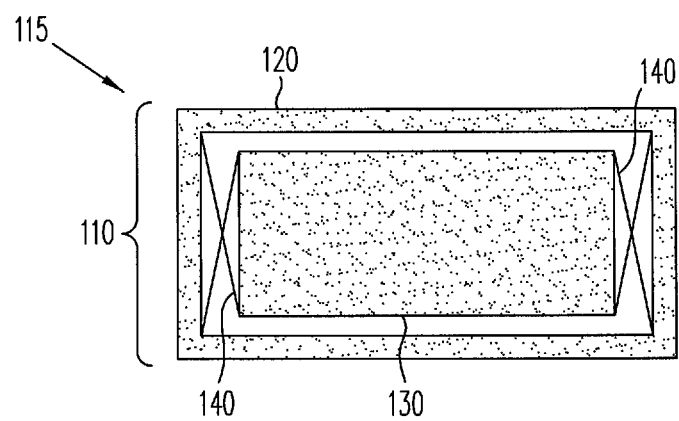

FIG. 5 illustrates a process of manufacturing MEMS device 100 in accordance with an embodiment of the invention. In step 510, a substrate 115 is provided as shown in the top view of FIG. 6. For example, in one embodiment, a silicon substrate may be used. Substrate 115 is then etched through appropriate MEMS micro-machining techniques in order to provide the physical structure of base 110 including frame 120, stage 130, and flexures 140 as shown in FIG. 7 (step 515).

FIGS. 8A-B through FIGS. 12A-B illustrate various cross-section side views and top views of a portion of substrate 115 undergoing further steps in the manufacturing process of FIG. 5 to form one of memory cells 150 on substrate 115. It will be appreciated that although the formation of a single memory cell 150 is illustrated in FIGS. 8A-B through FIGS. 12A-B, a plurality of memory cells 150 may be simultaneously performed in the manufacturing process of FIG. 5.

Figure 8A:
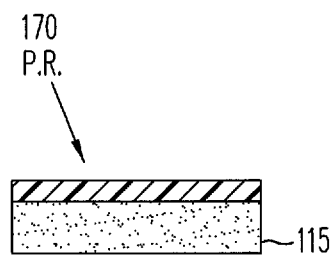
Figure 8B:
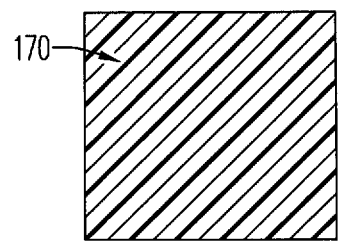
Figure 9A:
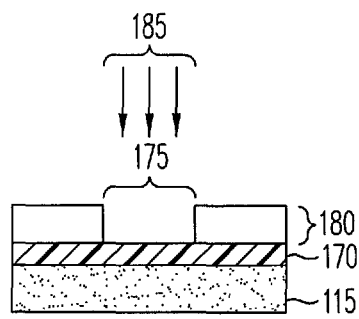
Figure 9B:
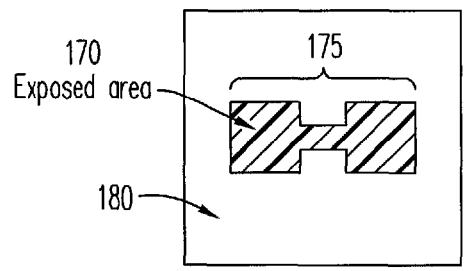

In step 520, substrate 115 is coated with a photoresist layer 170 as shown in FIGS. 8A and 8B. Then, in step 525, portions of photoresist layer 170 are covered by an isolation mask 180 having a fuse pattern 175 that exposes a portion of photoresist layer 170 as shown in FIGS. 9A and 9B (step 525). In various embodiments, mask 180 may be implemented, for example, as a contact mask or a projection mask used to provide fuse pattern 175.

Figure 10A:
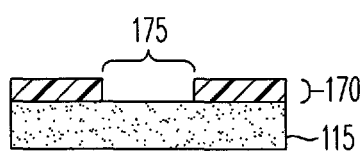
Figure 10B:
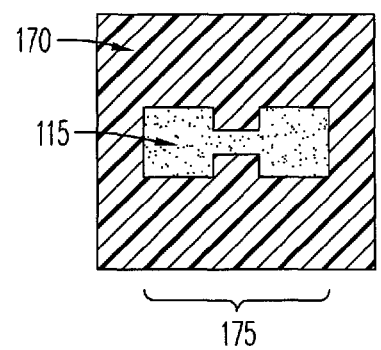
Figure 11A:
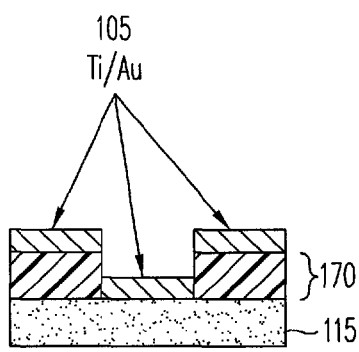
Figure 11B:
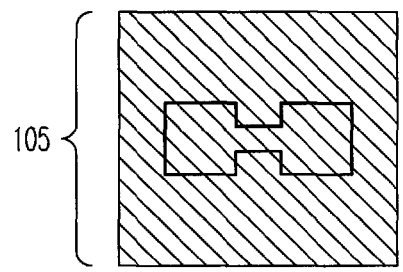

In step 530, the portions of photoresist layer 170 exposed by mask 180 are etched away as shown by arrows 185. Mask 180 is then removed in step 535 which reveals a portion of substrate 110 in the shape of fuse pattern 175 as shown in FIGS. 10A and 10B. Then, in step 540, a metal layer 105 comprising titanium (Ti), gold (Au), or other appropriate metal is deposited on remaining portions of photoresist layer 170 and the exposed portion of substrate 115 as shown in FIGS. 11A and 11B.

Figure 12A:
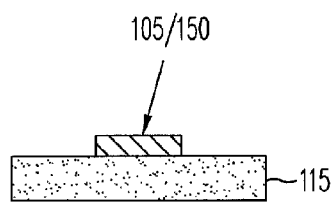
Figure 12B:
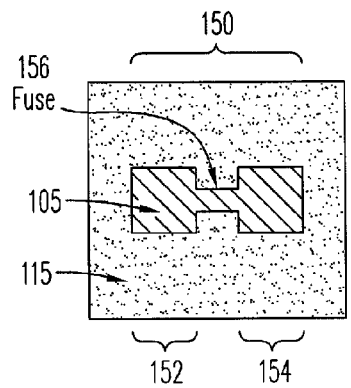

In step 545, portions of metal layer 105 outside of fuse pattern 175 as well as the remaining portions of photoresist layer 170 are removed as shown in FIGS. 12A and 12B. In one embodiment, step 545 may be performed by exposing the structure to an appropriate solvent for dissolving photoresist layer 170. As a result, portions of metal layer 105 attached to photoresist layer 170 will be removed with photoresist layer 170, while other portions of metal layer 105 attached to substrate 115 will remain.

It will be appreciated that following step 545, one or more memory cells 150 will now have been formed on substrate 115. Then, in step 550, fuses 156 of memory cells 150 may be selectively programmed in order to store desired logic states in memory cells 150.

Figure 13:
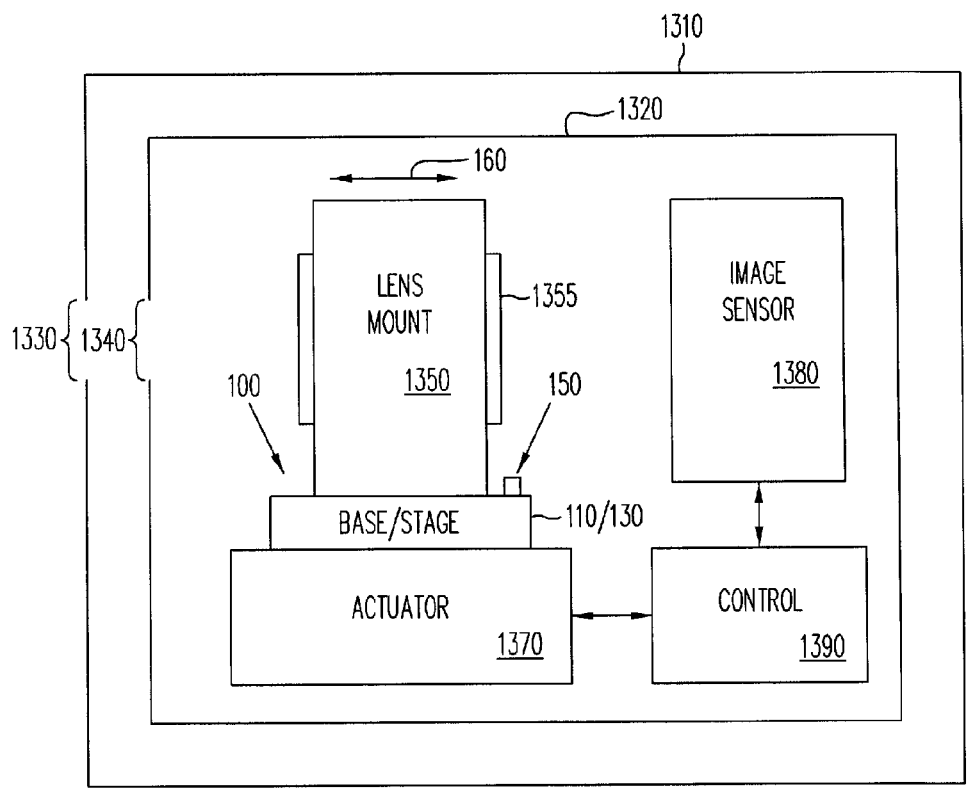
FIG. 13 shows a block diagram of a personal electronic device including a miniature camera in accordance with an embodiment of the invention.

FIG. 13 shows a block diagram of a personal electronic device 1310 including a miniature camera 1320 in accordance with an embodiment of the invention. Device 1310 may be a portable computer, a laptop computer, a notebook computer, a pocket personal computer (pocket PC), a personal digital assistant (PDA), a mobile telephone, or other device including camera 1320. Camera 1320 may be implemented, for example, as a digital still camera or a digital video camera with an adjustable focus.

Device 1310 and camera 1320 include apertures 1330 and 1340, respectively, which may receive light reflected from external objects. Camera 1320 includes a lens barrel 1355, a lens mount 1350, base 110 with one or more integrated memory cells 150, an actuator 1370, an image sensor 1380, and a control block 1390. Light received through apertures 1330 and 1340 passes through one or more lenses of lens barrel 1355 and may be captured by image sensor 1380.

Actuator 1370 may be in electrical, mechanical, and/or electro-magnetic communication with stage 130 of base 110 for controlling the position of stage 130. In this regard, actuator 1370 may be implemented in accordance with any appropriate mechanism for providing controlled movements on a scale appropriate for device 1310. For example, in various embodiments, actuator 1370 may be implemented as a Lorentz motor, a MEMS device, or other appropriate apparatus such as, for example, those disclosed in U.S. patent application Ser. No. 11/190,307 filed on Jul. 26, 2005 and entitled "MEMS Digital Linear Actuator" which is incorporated herein by reference, or those disclosed in U.S. patent application Ser. No. 11/263,149 filed on Oct. 31, 2005 and entitled "Lorentz Actuator For Miniature Camera" which is incorporated herein by reference.

As previously described with regard to FIG. 1, stage 130 of base 110 may be configured to move in the directions of arrows 160. In this regard, actuator 1370 may be configured to translate stage 130 of base 110 toward or away from image sensor 1380 in the direction of arrows 160 also shown in FIG. 13. Lens mount 1350 may be secured to stage 130 of base 110, thereby permitting lens mount 1350 and lens barrel 1355 to move in the directions of arrows 160 in response to actuator 1370.

Image sensor 1380 may be configured to capture digital images from light passing through lens barrel 355. Image sensor 1380 may be implemented using any appropriate technology for capturing digital images such as, for example, a charge-coupled device (CCD) or complimentary metal-oxide semiconductor (CMOS) device. Images captured by image sensor 170 can be provided to one or more control blocks 1390 which may be implemented with appropriate hardware and/or software to control actuator 1370 and process the images.

In view of the present disclosure, it will be appreciated that memory cells may be integrated with MEMS devices. Advantageously, such configurations can provide space savings by reducing the need for MEMS devices to interface with other memory units that are separate from MEMS components. In addition, by performing MEMS micromachining operations and memory cell formation operations on a common substrate during a combined process, manufacturing costs and times can be reduced.

Integrated memory cells in accordance with various embodiments described herein can be used, for example, to store lot information (e.g., lot numbers, dates, serial numbers, or other lot information) or other characteristic information (e.g., stiffness or other characteristics) associated with a particular MEMS device or group of MEMS devices. Such information can be used, for example, to determine lot numbers or other characteristics of particular MEMS devices exhibiting operational problems. By tracking such problems using integrated memory cells, the yield of MEMS manufacturing processes can be increased. In other embodiments, integrated memory cells as described herein can be programmed and/or read during operation of MEMS devices by appropriate read/write circuitry. It will be appreciated that the various techniques described herein may also be applied to the manufacture of other types of circuits which may be integrated with a substrate of a MEMS device.

Where applicable, the various components set forth herein can be combined into composite components and/or separated into sub-components without departing from the spirit of the invention. Similarly, where applicable, the ordering of various steps described herein can be changed, combined into composite steps, and/or separated into sub-steps to provide features described herein.

The foregoing disclosure is not intended to limit the invention to the precise forms or particular fields of use disclosed. It is contemplated that various alternate embodiments and/or modifications to the invention, whether explicitly described or implied herein, are possible in light of the disclosure.

Having thus described embodiments of the invention, persons of ordinary skill in the art will recognize that changes may be made in form and detail without departing from the scope of the invention. Thus the invention is limited only by the following claims.

What is claimed is:

1. A miniature camera including a micro-electro-mechanical systems (MEMS) device, the miniature camera comprising:
a frame of the MEMS device disposed within the miniature camera;
a stage of the MEMS device also disposed within the miniature camera;
a plurality of flexures coupling the stage to the frame for translational movement of the stage relative to the frame, wherein the frame and the stage are semiconductor structures; and
a plurality of single-layer fuses disposed directly on a surface of at least one of the stage or plurality of flexures, wherein the stage and plurality of flexures are portions of the MEMS device that are adapted to move relative to the frame, and wherein the single layer fuses are adapted to store characteristic information associated with the MEMS device.

2. The MEMS device of claim 1, wherein the semiconductor structures comprise a generally planar base, and the MEMS device further comprises an actuator adapted to actuate the stage relative to the frame.

3. The MEMS device of claim 2, wherein the frame, stage, and flexures comprise one integral body formed from a semiconductor substrate.

4. The MEMS device of claim 2, wherein the base is adapted to support a lens mount of a miniature camera.

5. The MEMS device of claim 1, wherein each of the single layer fuses comprises first and second conductive portions, the single layer fuses forming blown fuses and intact fuses, wherein the intact fuses include a conductive path between the first and second conductive portions, and wherein a portion of read/write circuitry for the single layer fuses is integrated with at least one of the plurality of flexures and adapted to program and/or read logic states of fuses on the stage during operation of the MEMS device.

6. The MEMS device of claim 3, wherein the semiconductor substrate comprises silicon.

7. The MEMS device of claim 1, wherein the MEMS device is configured to be part of a personal electronic device.

8. The miniature camera of claim 1, further comprising at least one additional single-layer fuse disposed directly on a surface of the frame.

9. A miniature camera, comprising:
a frame;
a stage;
a plurality of flexures coupling the stage to the frame for translational movement of the stage relative to the frame, wherein the frame and the stage are semiconductor structures;
a plurality of single-layer fuses disposed directly on a surface of at least one of the stage or plurality of flexures, wherein the stage and plurality of flexures are portions of the MEMS device that are adapted to move relative to the frame, and wherein the single layer fuses are adapted to store characteristic information associated with the MEMS device;
a lens secured to the stage;
an image sensor adapted to capture images from light received through the lens; and
an actuator adapted to move the stage relative to the frame and the image sensor.

10. The miniature camera of claim 9, wherein each of the single layer fuses comprises: first and second conductive portions, the single layer fuses forming blown fuses and intact fuses, wherein the intact fuses include a conductive path between the first and second conductive portions.

11. The miniature camera of claim 9, wherein the single layer fuses are further adapted to store characteristic information associated with the miniature camera.

12. The miniature camera of claim 9, wherein the frame, stage, and flexures comprise one integral body formed from a substrate.

13. The miniature camera of claim 12, wherein the substrate comprises silicon.

14. The miniature camera of claim 9, wherein the miniature camera is configured to be part of a personal electronic device.

15. The miniature camera of claim 9, further comprising at least one additional single-layer fuse disposed directly on a surface of the frame.

* * * * *